(12) United States Patent
Baumann et al.

(10) Patent No.: US 8,486,184 B2
(45) Date of Patent: Jul. 16, 2013

(54) OXYGEN-PERMEABLE MEMBRANE AND METHOD FOR THE PRODUCTION THEREOF

(75) Inventors: Stefan Baumann, Aachen (DE); Jose Manuel Serra Alfaro, Valencia (ES); Wilhelm Albert Meulenberg, AA Vijlen (NL); Hans-Peter Buchkremer, Heinsberg (DE); Detlev Stoever, Niederzier (DE)

(73) Assignee: Forschungszentrum Juelich GmbH, Juelich (DE)

( * ) Notice: Subject to any disclaimer, the term of this patent is extended or adjusted under 35 U.S.C. 154(b) by 328 days.

(21) Appl. No.: 12/736,015

(22) PCT Filed: Feb. 21, 2009

(86) PCT No.: PCT/DE2009/000256
§ 371 (c)(1),
(2), (4) Date: Oct. 5, 2010

(87) PCT Pub. No.: WO2009/117978
PCT Pub. Date: Oct. 1, 2009

(65) Prior Publication Data
US 2011/0020192 A1 Jan. 27, 2011

(30) Foreign Application Priority Data
Mar. 28, 2008 (DE) .......... 10 2008 016 158

(51) Int. Cl.
*B01D 53/22* (2006.01)
*B01D 71/02* (2006.01)

(52) U.S. Cl.
USPC ......... 96/11; 95/45; 95/54; 422/211; 427/244

(58) Field of Classification Search
USPC ......... 96/4, 11; 95/45, 54; 422/211; 427/244, 427/245
See application file for complete search history.

(56) References Cited

U.S. PATENT DOCUMENTS

| 5,534,471 A | 7/1996 | Carolan et al. |
| 5,599,383 A | 2/1997 | Dyer et al. |

(Continued)

FOREIGN PATENT DOCUMENTS

| DE | 10 2004 046 310 | 4/2006 |
| EP | 0 663 231 | 7/1995 |

(Continued)

*Primary Examiner* — Jason M Greene
(74) *Attorney, Agent, or Firm* — Jordan and Hamburg LLP

(57) ABSTRACT

A composite membrane for selective gas separation, comprises a layer system having a continuously porous, mechanically stable carrier layer, which has an average pore size in the µm range, further having at least one continuously porous intermediate layer, which is disposed on the carrier layer and has an average pore size in the range of 2 to 200 nm, and further having a gastight functional layer, which is disposed on the intermediate layer and is made of a mixed-conductive material having a maximum layer thickness of 1 µm. The carrier layer comprises a structural ceramic, a metal, or a cermet and has a layer thickness of no more than 1 mm. The intermediate layer is present with a total layer thickness of no more than 100 µm and has an average pore size in the range of 10 to 100 nm. The functional layer comprises a perovskite, a fluorite, or a material having a $K_2NiF_4$ structure, such as $La_{1-x}Sr_xCo_{1-y}Fe_yO_{3-\delta}$ (LSCF). The layer thickness of the functional layer is no more than 50 nm, and particularly between 25 and 400 nm. In order to produce this composite membrane, at least one porous intermediate layer is applied onto a continuously porous, mechanically stable carrier layer, which has an average pore size in the µm range, wherein the intermediate layer has an average pore size in the range of 2 to 200 nm. A further gastight, functional layer made of a mixed-conductive material and having a maximum layer thickness of 1 µm is applied onto the intermediate layer.

35 Claims, 2 Drawing Sheets

U.S. PATENT DOCUMENTS

| | | | |
|---|---|---|---|
| 6,368,383 B1 * | 4/2002 | Virkar et al. | 95/54 |
| 6,565,632 B1 * | 5/2003 | van Hassel et al. | 95/54 |
| 7,229,537 B2 | 6/2007 | Chen et al. | |
| 7,279,025 B2 * | 10/2007 | Apte et al. | 95/54 |
| 7,513,932 B2 * | 4/2009 | Carolan et al. | 95/54 |
| 7,927,405 B2 * | 4/2011 | Bacino et al. | 95/54 |
| 8,016,924 B2 | 9/2011 | Meulenberg et al. | |
| 2002/0106495 A1 | 8/2002 | Sirman et al. | |
| 2003/0218991 A1 | 11/2003 | Besecker et al. | |
| 2005/0006249 A1 * | 1/2005 | Suzuki et al. | 205/633 |
| 2005/0061663 A1 | 3/2005 | Chen et al. | |
| 2007/0140933 A1 | 6/2007 | Besecker et al. | |
| 2008/0047431 A1 * | 2/2008 | Nagabhushana et al. | 96/11 |
| 2009/0193975 A1 | 8/2009 | Meulenberg et al. | |
| 2010/0251888 A1 * | 10/2010 | Fekety et al. | 95/54 |

FOREIGN PATENT DOCUMENTS

| | | |
|---|---|---|
| EP | 0 732 139 | 9/1996 |
| WO | WO-01/93987 | 12/2001 |
| WO | WO-03/074161 | 9/2003 |
| WO | WO-2005/009730 | 2/2005 |

* cited by examiner

OXYGEN-PERMEABLE MEMBRANE AND METHOD FOR THE PRODUCTION THEREOF

The invention relates to an oxygen-permeable membrane, which is particularly for use for $CO_2$ separation in power plants, and to a method for the production thereof.

BACKGROUND OF THE INVENTION

Approximately 80% of the energy used around the world is generated by the conversion of fossil fuels. This is associated with significant $CO_2$ emissions, which are considered one of the causes of global warming. A first goal is therefore to reduce, or completely avoid, $CO_2$ emissions directly at the power producing plants.

In principle, three routes are possible for separating $CO_2$ in power plant processes using fossil primary energy carriers.

a) Separating After Energy Conversion:

Using complex apparatuses and chemical treatment, $CO_2$ having low concentrations is removed from the low-temperature waste gas flow of the energy conversion plants (separating task: $CO_2/N_2$)

b) Oxygen Combustion

The use of pure oxygen instead of air as the oxidizing agent for the combustion of gas or carbon results in a lesser quantity of highly $CO_2$-enriched waste gas having low nitrogen fractions, from which the $CO_2$ can generally be removed considerably more easily than in process a). The disadvantage is that pure oxygen must first be obtained (separating task, air separation: $O_2/N_2$). While cryogenic air separation is available on an industrial scale, it is very cost-intensive depending on the purity level of the separated $O_2$ (95% to 99.5%).

c) Decarbonizing Prior To Energy Conversion:

Here, the carbon is removed from the fossil fuel prior to the actual combustion process by convertion of the fuel, notably carbon, into $CO_2$ and hydrogen gas by partial oxidation or reformation (separating task: $CO_2/H_2$), and the combustion of hydrogen. The $CO_2$ can be washed out using physical or chemical washing solutions. This is also an easier method for separating the $CO_2$ from the gas mixture than the process described in process a) because, here again, considerably higher concentrations and pressures are present for the $CO_2$.

All the concepts described above result in a considerable reduction of the thermal efficiency and require complex apparatus, which therefore make these energy conversion methods having reduced $CO_2$ output more cost-intensive.

Until now, neither solid adsorbents, nor porous membranes, nor zeolite beds or membranes have been able to effect such gas separation in a suitable manner, cost-effectively, and on an appropriate scale.

A potentially suitable method, which is associated with considerably lower efficiency losses, is gas separation by way of ceramic membranes. Ceramic membranes have high chemical and thermal stability and can be used in all three power plant routes. Existing ceramic membranes, however, have insufficient permeation or separation rates or are not stable under process conditions.

The permeation rate constitutes the volume flow per unit of time of the permeating component, relative to the membrane surface [$ml/(cm^2 min)$]. The selectivity is described with what is referred to as the separation factor, which is derived from the ratio of the permeation rate to the gases to be separated, and is infinite for dense but oxygen-semipermeable membranes.

In addition, with respect to membranes, a differentiation is made between bulk membranes and asymmetrical membranes. While a bulk membrane (monolithic membrane) has a single material layer, an asymmetrical membrane has a layer design comprising at least two different layers, a separating layer and a porous support layer.

All monolithic membranes that have been developed for the above fields of application with layer thicknesses of 0.5-1 mm, however, have insufficient permeation rates and/or insufficient stability with respect to the thermochemical or thermomechanical demands.

With regard to the asymmetrical membranes, a differentiation is made between so-called integral asymmetrical membranes, in which the separating layer and support layer comprise the same material, and the composite membranes, in which the multi-layer design is achieved by applying a gastight separating layer onto a previously manufactured (micro)porous support layer using a separate step.

It is conceivable to produce asymmetrical membranes having separating layer thicknesses of less than 100 µm from materials that have maximum permeation rates, such as $Ba_{0.5}Sr_{0.5}Co_{0.8}Fe_{0.2}O_{3-\delta}$. However, given the extraordinary thermal and chemical expansion characteristics of these materials, they necessarily require a carrier that is made of the same material as the separating layer. This material, however, frequently has lower chemical and mechanical stability and is also relatively expensive.

For this reason, selecting a suitable material for use in a separating membrane and in the support layer thereof for a specified separating problem is one of the greatest current challenges. The search is for a material which not only has high permeability, high selectivity, and high chemical stability, but additionally exhibits the necessary thermomechanical properties that make it possible to use this material to produce a defect-free, thin, yet elastic film for a membrane.

Presently, both planar and tubular concepts are available for gas separation by way of membranes, wherein a graded layer structure is generally present. Starting from a mechanically stable, macroporous substrate having pore diameters of 50 to 100 nm, one or more mesoporous ($50 > d_{Pore} > 2$ nm) or microporous ($d_{Pore} < 2$ nm) layers are applied using different methods. For example, approaches are available for separating $H_2/CO_2$ and $CO_2/N_2$ by way of microporous membranes comprising silica ($SiO_2$), $TiO_2$ and/or $ZrO_2$. Dense ceramic mixed conductors, which generally have a perovskite structure ($ABO_{3-\delta}$ where A=La, Pr, Ba, Sr, Ca and the like, and B=Co, Fe, Mn, Cr, Ti, Ni, Cu and the like, or mixtures thereof), are used for oxygen separation from the air.

SUMMARY OF THE INVENTION

It is the object of the invention to create a semipermeable membrane, and particularly an oxygen-permeable membrane, for use in gas separation, which overcomes the disadvantages of the prior art described. It is a further object of the invention to provide a corresponding method for producing such a membrane.

The objects of the invention are achieved by a semipermeable membrane having all of the characteristics according to the main claim and by a production method for a semipermeable membrane according to the additional independent claim. Advantageous embodiments of the method and of the membrane will be apparent from the respective dependent claims.

Within the context of the invention, it was found that a thin membrane having a total layer thickness of less than 1 mm, comprising a porous carrier layer, one or more porous intermediate layers, and a functional layer having a layer thickness of not more than 500 nm disposed thereon, provides an effective separating power for the oxygen separation.

The carrier layer advantageously produces the mechanical stability of the membrane. It can notably be made of steel, such as 316 L stainless steel, a structural ceramic (such as $Al_2O_3$ or $ZrO_2$) or a cermet (mixture of ceramic and metal). The thickness of the carrier layer depends on the separating task and can vary between 100 μm and 1 mm. The thickness of the carrier layer influences the permeation rate and, in principle, should therefore have the thinnest possible design, notably less than 1 mm. In order to satisfy its function as the carrier layer, advantageously layer thicknesses of at least 100 μm, and preferably 200 μm, are desirable. Metallic carrier layers generally exhibit better mechanical stability than ceramic layers having comparable layer thicknesses.

The carrier layer as such has a continuously porous configuration and, on average, comprises pores in the μm range. These average pore diameters can be determined in particular by SEM (scanning electron microscopy) or, in the case of smaller pore diameters, by TEM (transmission electron microscopy). The pores are selected considerably larger than those of the adjacent intermediate layer. The carrier layer is intended to provide mechanical stability, yet generate no flow resistance, to the extent that this is possible. If necessary, the carrier may also have a graded design.

So as to ensure the gastight application of the very thin separating layer, it has proven advantageous to provide at least one intermediate layer, which is disposed between the carrier layer and functional layer. This intermediate layer generally comprises oxidic systems, and particularly ceramics. Advantageous materials for the intermediate layer are $TiO_2$, $ZrO_2$ or doped $CeO_2$, for example. The materials of the intermediate layer should not undergo any chemical reactions with either the carrier material or the functional layer, which could negatively influence the functionality of the overall system during long-term operation. The intermediate layer essentially functions to adjust the pore structure and surface quality (roughness and the like) of the carrier to the needs of the separating layer.

In an advantageous embodiment of the invention, a catalytically active layer can be provided on either side of the separating layer as the last intermediate layer or as an additional layer, the catalytically active layer having, for example, limited mixed conductivity, but high catalytic activity for the incorporation of oxygen. A suitable material would be, for example, $Ce_{1-x}Gd_xO_2$ (CGO), $La_{1-x}Sr_xCo_{1-y}Fe_yO_{3-\delta}$ (LSCF) or a mixture thereof, which may additionally be impregnated with a noble metal, such as Pt or Pd.

The total layer thickness of the intermediate layer, or of all intermediate layers, should not exceed 30 μm, and more particularly it should not exceed 20 μm, so as to ensure maximum permeability.

The intermediate layer likewise has a continuously porous design. The average pore diameter of the intermediate layer advantageously ranges between 2 and 200 nm, and particularly between 10 and 100 nm. In a particularly advantageous embodiment of the invention, the intermediate layers have a graded design, and the pore diameter gradually decreases from the carrier layer in the direction of the functional layer because of the arrangement of the plurality of intermediate layers.

The functional layer disposed on the intermediate layer brings about the actual separation of the gas molecules. The functional layer as such is gastight, this meaning it does not allow gases to pass. The oxygen is transported through this layer exclusively by way of the incorporation and transport of oxygen in ionic form and the return transport of the corresponding electrons at the same time. For this reason, this functional layer must comprise a mixed-conductive material, such as perovskite, fluorite or have a $K_2NiO_4$ structure. The total layer thickness of this functional layer is advantageously less than 1 μm, particularly less than 500 nm, and particularly advantageously between 25 and 400 nm. The low layer thickness advantageously results in material cost savings. Furthermore, it has the advantage that the functional layer is elastic, and thus the different thermal expansion rates of the various layers that are involved do not usually cause any problems. Thus, it is also possible to achieve the maximum permeation rate for the particular material. Materials that are particularly suited for the functional layer include perovskite materials, such as $Ba_{1-x}Sr_xCo_{1-y}Fe_yO_{3-\delta}$ (BSCF) or $La_{1-xSrxCo1-y}Fe_yO_{3-\delta}$ (LSCF). However, fluorites (such as $Ce_{1-x}M_xO_2$ where M=Gd, Pr, Sm and the like) or materials having a $K_2NiO_4$ structure, such as those based on $La_2NiO_{4+\delta}$, may also be used.

In a further advantageous embodiment of the invention, the functional layer is present in the form of a graded layer, optionally in conjunction with an intermediate layer. The properties of the intermediate layer mentioned above are then notably present at the carrier layer/graded layer interface, while the properties of the functional layer mentioned above are notably present at the free surface of the layer system. This means that, in principle, the average pore diameter decreases continuously or in a graded manner from the carrier layer to the free surface of the gas/functional layer.

Optionally, a further thin protective layer may also be disposed on the separating layer. This is advisable especially in cases where the contact with a medium would otherwise cause undesirable chemical reactions. Depending on the porosity, the protective layer generally has a layer thickness of less than 50 nm, and advantageously even less than 25 nm.

However, within the context of the invention it is also conceivable to dispose another porous catalytically active layer on the outer functional layer or protective layer so as to overcome kinetic obstacles during oxygen incorporation or removal.

In order to produce the apparatus for gas separation according to the invention, first a porous ceramic or metallic film, having a layer thickness of 200 to 1000 μm, is provided as the carrier layer. A cermet is also conceivable as the carrier layer. The pore sizes of this carrier layer are in the μm range.

One or more ceramic intermediate layers having pores in the range from 1-200 nm, and particularly pores in the range of 2-100 nm, are applied onto one side of the carrier layer, for example. Applying the intermediate layer is particularly useful in preventing warpage of a very thin carrier layer during the heat treatment. As mentioned above, different intermediate layers may be disposed so as to achieve decreasing grading with respect to the porosity in the direction of the functional layer. The intermediate layer or layers can advantageously be applied onto the carrier using conventional application methods, such as wet powder spraying or screen printing. Sol-gel methods are also possible, especially for layers having small pores, wherein first a sol-gel precursor is applied and subsequently pyrolyzed.

The functional layer required for the actual gas separation can advantageously also be applied by way of a sol-gel method. Other possible application techniques, however, include CVD (chemical vapor deposition) and PVD (physical vapor deposition). In the sol-gel method, the porosity in the functional layer is adjusted by the sol composition, the pyrolysis conditions, which is the burnout of the organic components, and the sintering conditions. Depending on the material, a single-layer or multi-layer application by way of sol-gel methods may be required.

The sol generally comprises stabilized particles of an $O_2$-permeable crystalline phase, such as perovskite, or a precursor of this phase having a mean particle size of 5 to 200 nm. The small particle size increases the sintering activity, allowing for compaction of the layer, even at low sintering temperatures (600-900° C.). In order to achieve a gastight membrane, it may be necessary to produce the layer from multiple individual layers or use a mixture of sols having different particle compositions (nano-composite).

The low layer thickness of the functional layer ensures sufficient elasticity, so that the differences in the thermal expansion do not play a disadvantageous role. Additionally, in this way, it is also possible to achieve the maximum possible permeation rate for the particular material.

However, if the ceramic membrane exhibits stability problems under typical operating conditions, for example because it reacts with components of the adjacent gas phase, or if it decomposes at low oxygen partial pressures, an additional, very thin layer that is made of another mixed-conductive material can optionally be applied onto the functional layer. Methods such as the sol-gel method or deposition from the gas phase, for example by way of PVD, CVD or PLD (pulsed laser deposition) or the like, are also possible and suitable for production of this protective layer.

As a further optioanal alternative, within the context of the invention, a further porous, catalytically active thin layer can be applied onto the functional layer, the function of which is to overcome kinetic obstacles during the incorporation and removal of oxygen ions from the adjacent gas phase into the material. Such a layer would advantageously be applied by way of screen printing, spraying methods, sol-gel methods, or PVD/CVD. A possible material that has the above-described desired catalytic properties would be, for example, $Ce_{1-x}Gd_xO_2$ (CGO)/$La_{1-x}Sr_xCo_{1-y}Fe_yO_{3-\delta}$ (LSCF), which is additionally impregnated with a noble metal, such as Pt or Pd.

The ceramic membranes according to the invention usually have high permeability, high selectivity, and good stability under usage conditions. They are particularly suited for the gas separation of oxygen from gas mixtures.

BRIEF DESCRIPTION OF THE DRAWINGS

The subject matter of the invention will be described hereinafter in more detail based on one embodiment, without thereby limiting the subject matter of the invention.

DESCRIPTION OF THE PREFERRED EMBODIMENTS

Figure 1:
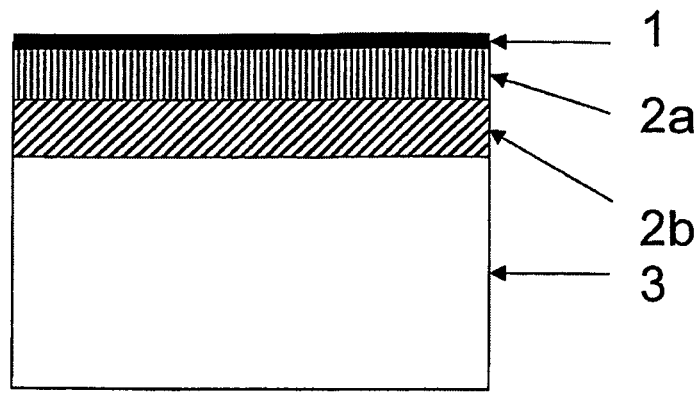
FIGS. 1 to 3 are schematic illustrations of three different embodiments of the membrane according to the invention.
Figure 2:
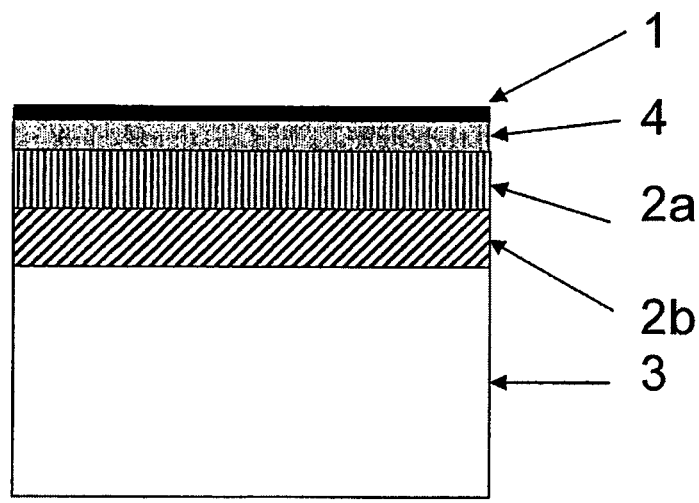
Figure 3:
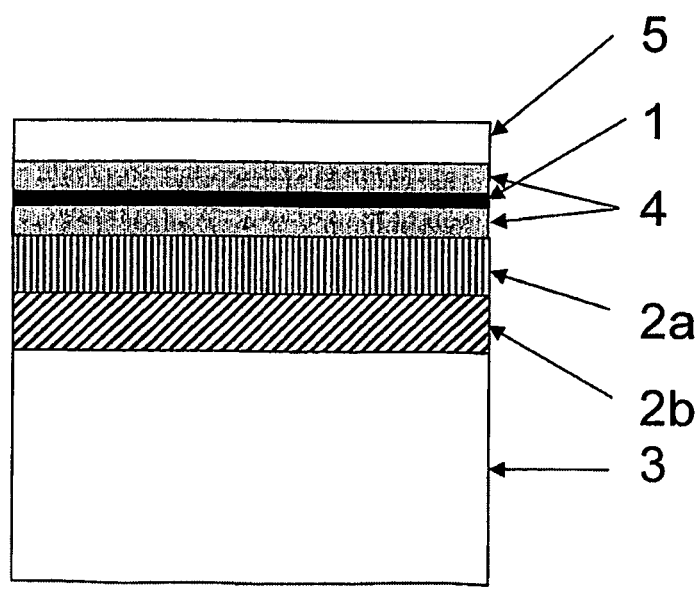

The following meanings apply:
1 gastight functional layer;
2 single-layer or multi-layer intermediate layer, optionally with graded design;
3 open-pore carrier layer;
4 optional catalytic layer, for overcoming kinetic obstacles during oxygen incorporation; and
5 optional protective layer on the surface of the membrane so as to improve stability.

Embodiment 1

1. A porous film-cast steel substrate that has been presintered at 900° C./1 minute and comprises a 316 L stainless steel (layer thickness d=200-300 μm, grain size less than 5 μm) is used.

2. A $TiO_2$ intermediate layer (layer thickness d=20-30 μm, grain size approximately 200 nm) is applied by way of wet powder spraying or screen printing. After sintering at 950° C./1 hour under vacuum, a second intermediate layer comprising $ZrO_2$, $TiO_2$ or $Ce_{1-x}Gd_xO_2$ (CGO) is applied. To this end, a sol-gel precursor comprising an organic precursor, such as titanium propylate, zirconium propylate, plus acetyl acetone and an α-position carboxylic acid is used, which is applied by way of spin coating or an immersion method. Thereafter, pyrolysis (for example, at 600° C./1 hour) of the organic components of the sol is carried out.

3. For the production of the sol for the functional layer (for example, $La_{1-x}Sr_xCo_{1-y}Fe_yO_{3-\delta}$, LSCF), a solution is produced from the respective metal nitrates, sodium linolate and ethanol. Following treatment in an autoclave (for example, at 80° C./24 hours), liquid/liquid extraction is carried out using xylene. A sol comprising LSCF particles in xylene is obtained. The functional layer is applied by way of spin coating or an immersion method. Thereafter, the sample is sintered at temperatures up to 900° C., which ensures sufficient compaction and crystallinity of the layer.

Embodiment 2

1. A presintered porous substrate comprising $ZrO_2$ or, as an alternative, $Al_2O_3$ is produced as the carrier.

2. An intermediate layer (layer thickness d=20-30 μm, grain size approximately 200 nm) comprising $ZrO_2$, $Al_2O_3$ or $TiO_2$ is applied by way of wet powder spraying or screen printing. After sintering, for example at 950° C./1 hour, a second intermediate layer comprising $ZrO_2$, $TiO_2$ or $Ce_{1-x}Gd_xO_2$ (CGO) is applied using a sol-gel method. To this end, a sol-gel precursor comprising an organic precursor, such as titanium propylate, zirconium propylate, plus acetyl acetone and a α-position carboxylic acid is used, which is applied by way of spin coating or an immersion method. Thereafter, pyrolysis (for example, at 600° C./1 hour) of the organic components of the sol is carried out. Afterwards, a thin, catalytically active layer (such as perovskite) is deposited by way of a sol-gel method and sintered. The particle size is selected sufficiently large so that the layer does not become dense during sintering further in the course of the process.

3. For the production of the sol for the functional layer (for example, $Ba_{1-x}Sr_xCo_{1-y}Fe_yO_{3-\oplus}$, BSCF), a solution is produced from the respective metal nitrates, sodium linolate and ethanol. Following treatment in an autoclave (for example, at 80° C./24 hours), a liquid/liquid extraction is carried out using xylene. A sol comprising BSCF particles in xylene is obtained. The functional layer is applied by way of spin coating or an immersion method. Thereafter, the sample is sintered at temperatures up to 900° C., which ensures sufficient compaction and crystallinity of the layer.

4. A thin ($\leq 25$ nm) dense layer, comprising LSCF, for example, is applied so as to offer protection from carbonate formation with the $CO_2$ from the adjacent gas phase.

5. In order to overcome kinetic obstacles, a catalytically active, porous layer comprising $La_{1-x}Sr_xCo_{1-y}Fe_yO_{3-\delta}$ impregnated with Pt is applied by way of a sol-gel method and sintered.

The invention claimed is:
1. A composite membrane for selective gas separation, comprising a layer system having a) a continuously porous, mechanically stable carrier layer, which has an average pore size in the μm range; b) at least one continuously porous intermediate layer with a layer thickness less than or equal to 100 μm, which is disposed on the carrier layer and has an average pore size of less than 5 nm; and c) a gastight functional layer with a layer thickness less than or equal to 500 nm.

2. The composite membrane according to claim 1, wherein the carrier layer comprises a structural ceramic, a metal, or a cermet.

3. A composite membrane according to claim 1, wherein the carrier layer has a graded design.

4. A composite membrane according to claim 1, wherein the carrier layer has a layer thickness of no more than 1 mm.

5. A composite membrane according to claim 1, wherein the intermediate layer comprises a ceramic.

6. A composite membrane according to claim 1, wherein the intermediate layer comprises $TiO_2$, $ZrO_2$, $Al_2O_3$ or $Ce_{1-x}Gd_xO_2$ (CGO).

7. A composite membrane according to claim 1, wherein the intermediate layer has a graded design.

8. A composite membrane according to claim 1, wherein the functional layer comprising perovskite or fluorite or a material having a $K_2NiF_4$ structure.

9. A composite membrane according to claim 1, wherein the functional layer comprising $La_{1-x}Sr_xCo_{1-y}Fe_yO_{3-d}$ (LSCF).

10. A composite membrane according to claim 1, comprising at least one porous catalytic layer which adjoins the functional layer and is able to reduce kinetic obstacles during oxygen exchange with the adjacent gas phase.

11. A composite membrane according to claim 1, comprising a further protective layer which is disposed on the surface of the membrane and is made of a mixed-conductive material, which is not identical to that of the functional layer.

12. The composite membrane according to claim 10, comprising a catalytic layer comprising $Ce_{1-x}Gd_xO_2$ (CGO)/$La_{1-x}Sr_xCo_{1-y}Fe_yO_{3-\delta}$ (LSCF), which is additionally impregnated with a noble metal.

13. A method for producing a composite membrane according to claim 1, comprising:
(a) applying at least one porous intermediate layer onto a continuously porous, mechanically stable carrier layer, which has an average pore size in the µm range, wherein the intermediate layer has an average pore size of less than 5 nm and has a thickness less than or equal to 100 µm; and
b) applying a further gastight functional layer made of a mixed-conductive material and having a maximum layer thickness of 500 nm onto this intermediate layer.

14. The method according to claim 13, wherein a carrier layer comprising a structural ceramic, a metal, or a cermet is used.

15. A method according to claim 13, wherein a graded carrier layer is used.

16. A method according to claim 13, wherein the carrier layer has a layer thickness of no more than 1 mm.

17. A method according to claim 13, wherein at least one ceramic intermediate layer is applied onto the carrier layer.

18. A method according to claim 12, wherein at least one intermediate layer comprising $TiO_2$, $ZrO_2$, $Al_2O_3$ or $Ce_{1-x}Gd_xO_2$ (CGO) is applied.

19. A method according to claim 13, wherein a graded intermediate layer is applied.

20. A method according to claim 13, wherein a functional layer comprising perovskite or fluorite or a material having a $K_2NiF_4$ structure is applied.

21. A method according to claim 13, wherein a functional layer comprising $La_{1-x}Sr_xCO_{1-y}Fe_yO_{3-d}$ (LSCF) is applied.

22. A method according to claim 13, wherein at least one further porous catalytic layer, which adjoins the functional layer and is able to reduce kinetic obstacles during oxygen exchange with the adjacent gas phase, is provided.

23. The method according to claim 22, wherein $Ce_{1-x}Gd_xO_2$ (CGO)/$La_{1-x}Sr_xCo_{1-y}Fe_yO_{3-d}$ (LSCF), which is further impregnated with a noble metal, is used as the material for the catalytic layer.

24. A method according to claim 13, wherein a protective layer is disposed on the surface of the membrane, wherein a mixed-conductive material, which is not identical to that of the functional layer, is used as the material for the protective layer.

25. A method according to claim 13, wherein at least one intermediate layer is applied by way of wet powder spraying or screen printing.

26. A method according to claim 13, wherein the functional layer is applied by way of a sol-gel method.

27. A method according to claim 13, wherein a catalytic layer is applied by way of screen printing, spraying methods, sol-gel methods or by way of deposition from the gas phase by way of PVD or CVD.

28. A method according to claim 13, wherein a protective layer is applied by way of a PVD, CVD, PLD or a sol-gel method.

29. A composite membrane according to claim 1, wherein the carrier layer has a layer thickness in the range of 100 µm and 1 mm.

30. A composite membrane according to claim 1, wherein the intermediate layer or layers have an overall layer thickness in the range of 100 nm to 50 µm.

31. A composite membrane according to claim 1, wherein the functional layer has a layer thickness in the range of 25 to 400 nm.

32. A method according to claim 13, wherein the carrier layer has a layer thickness in the range of 100 µm to 1 mm.

33. A method according to claim 13, wherein application is made of an intermediate layer, or intermediate layers, having an overall layer thickness in the range of 100 nm to 50 µm.

34. A method according to claim 13, wherein a functional layer having a layer thickness in the range of 25 to 400 nm, is applied.

35. A composite membrane for selective gas separation formed as a layer system, the composite membrane comprising:
a continuously porous, mechanically stable carrier layer, which has an average pore size in the µm range, the carrier layer comprising a material from among the group of materials comprising: steel, ceramic and cermet;
at least one continuously porous intermediate layer with a layer thickness less than or equal to 100 µM, which is disposed on the carrier layer and has an average pore size of less than 5 nm, said intermediate layer forming a ceramic oxidic system that is inert to material of the carrier layer and to material of a gastight functional layer; and
the gastight functional layer with a layer thickness less than or equal to 500 nm that performs said selective gas separation by transporting oxygen in ionic form through the functional layer concurrently with return transport of electrons, the gastight functional layer comprising a material from among the groups of materials including perovskite material, fluorites, and $K_2NiO_4$.

* * * * *